United States Patent [19]

Nagano

[11] Patent Number: 5,009,119

[45] Date of Patent: Apr. 23, 1991

[54] BRAKE CONTROL APPARATUS FOR BICYCLE

[75] Inventor: Masashi Nagano, Izumi, Japan

[73] Assignee: Shimano Industrial Company Limited, Osaka, Japan

[21] Appl. No.: 417,031

[22] Filed: Oct. 4, 1989

[30] Foreign Application Priority Data

Oct. 7, 1988 [JP] Japan .......................... 63-132123[U]

[51] Int. Cl.⁵ .......................... B62K 23/06; B62L 3/02
[52] U.S. Cl. .................................. 74/489; 74/502.2; 267/74
[58] Field of Search ...................... 74/488, 489, 502.2; 267/74

[56] References Cited

U.S. PATENT DOCUMENTS 4,674,353  6/1987  Yoshigai .................... 267/158 X

FOREIGN PATENT DOCUMENTS 23007     11/1956  Fed. Rep. of Germany ........ 74/489
1141954   3/1957   France ............................. 74/489
20124     of 1914  United Kingdom ............... 74/502.2
1207484   10/1970  United Kingdom ................. 74/489

*Primary Examiner*—Allan D. Herrmann
*Attorney, Agent, or Firm*—Dickstein, Shapiro & Morin

[57] ABSTRACT

A brake control apparatus includes a bracket, a brake lever pivoted to the bracket via a lever shaft and a lever spring for urging the brake lever to its home position relative to the bracket. The lever spring has first and second spring legs engageable respectively with the bracket and the brake lever and a coil portion disposed between the first and second spring legs. A return movement of the brake lever to its home position relative to the bracket is realized by flexion of a radial center line of the coil portion of the lever spring. With this control apparatus, the lever spring can provide substantially constant urging force regardless of the pivot amount of the brake lever and the lever spring does not produce unpleasant creaking noises in the course of a braking operation.

7 Claims, 2 Drawing Sheets

BRAKE CONTROL APPARATUS FOR BICYCLE

BACKGROUND OF THE INVENTION

1. Field of the Invention

The present invention relates to a brake control apparatus for a bicycle, and more particularly to a control apparatus of the above type including a bracket, a brake lever pivoted to the bracket via a lever shaft and a lever spring for urging the brake lever to its home position relative to the bracket.

2. Description of the Prior Art

Such a conventional brake control apparatus is known from a Japanese patent laid open under No. 63-173781. This apparatus employs, as the lever spring, such urging means as a plate spring, a bar spring, a torsion coil spring, or a tension coil spring. Of these choices, the torsion coil spring or the tension coil spring are preferred since the plate spring or the bar spring has the disadvantage that its urging force varies significantly according to a pivotal amount of the brake lever.

However, when the torsion coil spring is employed, it becomes necessary to restrict displacement of the spring in a directional normal to a central axis thereof. To this end, the coil portion of the spring should have a smallest possible number of turns, and at the same time these turns should be wound as closely as possible to each other. As a result, an urging force of the thus constructed spring again varies significantly according to a pivotal amount of the brake lever. Moreover, when the spring is deformed with a brake lever operation, the turns of the coil portion of the spring radially displace, i.e. come into sliding contact with each other which contact produces unpleasant creaking noise to a cyclist.

On the other hand, the tension coil spring, as a lever spring, has the disadvantage of requiring large space in the bracket to permit free movements of the spring associated with brake lever operations. Hence, the tension coil spring is unsuitable for such brake control apparatuses which should be formed compact. If it is attempted to limit the amount of the spring movements, this will only result in generation of further creaking noise from sliding contact between the spring and a portion used for limiting the spring movement and will result also in disadvantageous complication of the construction around the spring.

In view of the above state of the art, the primary object of the present invention is to solve these problems of the prior art by providing an improved brake lever control apparatus for a bicycle. With this improved apparatus of the invention, the brake lever can be operated by approximately fixed, i.e. same manual force regardless of the amount of pivotal motion of the brake lever and the lever spring does not generate unpleasant creaking noise in the course of the breaking operation.

SUMMARY OF THE INVENTION

For accomplishing the above-noted object, according to the present invention, a brake control apparatus for a bicycle, comprises: a bracket; a brake lever pivoted to the bracket via a lever shaft; and a lever spring for urging the brake lever to its home position relative to the bracket; wherein the lever spring includes first and second spring legs engageable respectively with the bracket and the brake lever and a coil portion disposed between the first and second spring legs, return movement of the brake lever to its home position relative to the bracket being realized by flexion of a radial center line of the coil portion of the lever spring.

With the above-described features of the invention, since the lever spring resiliently deforms through the flextion of the radial center of its coil portion, although the turns of the coil portion contact each other, these do not slide with each other. Thus, the generation of creaking noise of the lever spring due to sliding contact between adjacent coil turns can be effectively avoided.

Further, since most of the resilient spring deformation takes place at the coil portion, an amount of the deformation per small unit length of the entire spring can be minimized. Accordingly, it becomes possible to reduce the disadvantageous variation of the spring urging force associated with variation in the pivot amount of the brake lever.

In addition, the urging force variation can be further reduced by the fact that the coil portion flexes along its radial center line with a relatively large curvature radius. Consequently, the spring can provide almost invariable urging force regardless of the pivotal amount of the brake lever. Moreover, with the above-described manner of coil portion deformation, it is hardly necessary to provide extra space to compensate with reduction in the spring-accommodating sprace resulting from a pivot operation of the brake lever.

As described above, the present invention has achieved its intended object of providing an improved brake lever control apparatus for a bicycle which brake lever can be operated by approximately the same manual force regardless of the amount of pivotal motion of the brake lever and which lever spring does not generate unpleasant creaking noise in the course of the braking operation.

Further, according to one preferred embodiment of the invention, the lever spring is disposed such that the flextion of its radial center line is confined within a plane normal to an axis of the lever shift. This arrangement assures maximum stability of lever spring mounting posture in the bracket against possible displacements of the spring by a brake lever operation.

According, to a further embodiment of the invention, the first spring leg of the lever spring is engaged into a spring receiver hole defined in the bracket while the second spring leg is placed in sliding contact with the bracket lever. This arrangement is advantageous for minimizing the variation in the lever spring deformation amount associated with variation in the pivot amount of the brake lever.

According to a still further embodiment of the invention, the second spring leg is placed in sliding contact with the brake lever via a roller attached to a leading end of the second spring leg. This arrangement is advantageous for smoothing the sliding between the second spring leg and the brake lever occuring with the pivotal motion of the brake lever.

Further, and other objects, features and effects of the invention will become apparent from the following more detailed description of the embodiments of the invention with reference to the accompanying drawings.

BRIEF DESCRIPTION OF THE DRAWINGS

Accompanying drawings FIGS. 1 through 5 illustrate one preferred embodiment of a brake control apparatus for a bicycle relating to the present invention; in which, FIG. 1 is a vertical section view of the control apparatus of the invention, FIG. 2 is a section view showing major portions of the apparatus in an enlarged scale, FIG. 3 is an enlarged front view of a lever spring, FIG. 4 is a side view showing the lever spring of FIG. 3, and FIG. 5 is an enlarged plane view of the lever spring.

DESCRIPTION OF THE PREFERRED EMBODIMENTS

Preferred embodiments of the invention will be particularly described hereinafter with reference to the accompanying drawings.

Figure 1:
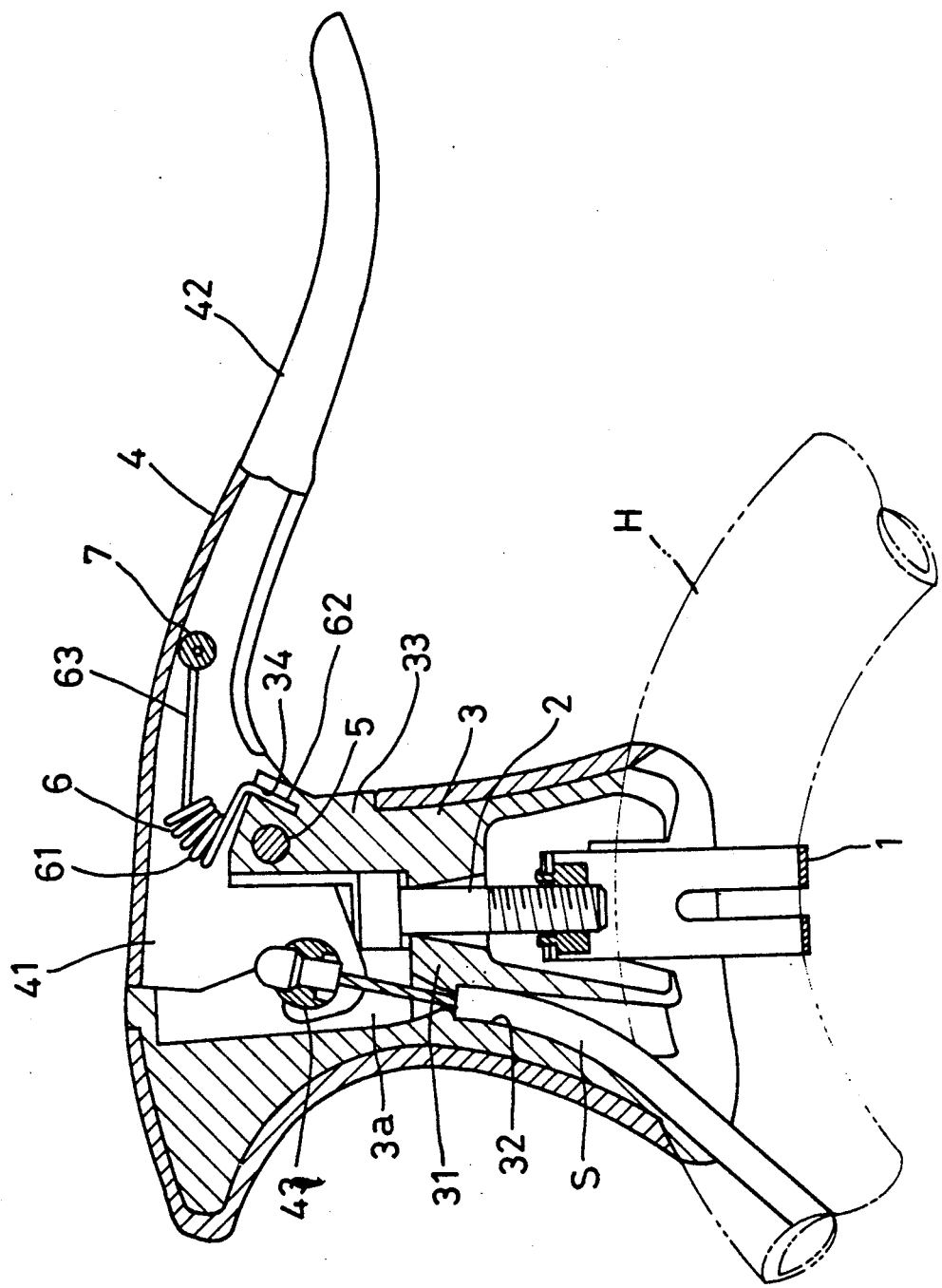

FIG. 1 shows an entire brake control apparatus of the invention, with the apparatus being attached to a curved portion of a drop handle bar H of a bicycle through a band member 1 and a fastening element 2 screwed into the band member 1. As shown, the brake control apparatus includes a bracket 3 which is fixed to the handle bar portion, a brake lever 4 having a base portion 41 and a manual control portion 42, and a lever shaft 5 which permits pivotal movements of the brake lever 4 relative to the fixed braket 3.

The bracket 3 is a cross-sectionally rectangular structure having an inner hollow portion 3a. In this inner hollow portion 3a, a middle wall 31 receives and supports therethrough the fastening element 2 and a through hole 32 is provided for receiving and supporting a brake control cable S which operatively connects the brake lever 4 with a brake device attached to the bicycle body.

The bracket 3 further includes a support wall 33 which extends further upwards relative to the middle wall 31. This support wall 33 pivotably supports the base portion 41 of the brake lever 4 via the lever shaft 5. The base portion 4 carries at its front position a cable stopper element 43 for receiving a hook fixed to a leading end of the brake control cable S. The base portion 41 has an inverse letter 'U' shaped cross section, and the manual control portion 42 is formed as a semiconductor cylindrical structure.

The brake control apparatus having the above-described construction further includes a lever spring 6, which will be described next with reference to FIGS. 2 through 5.

Figure 2:
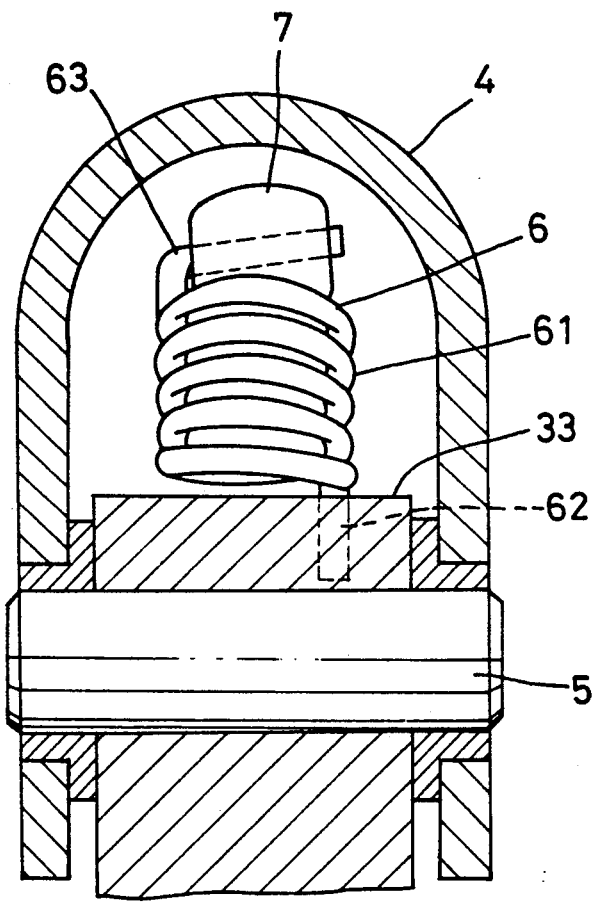
Figure 3:
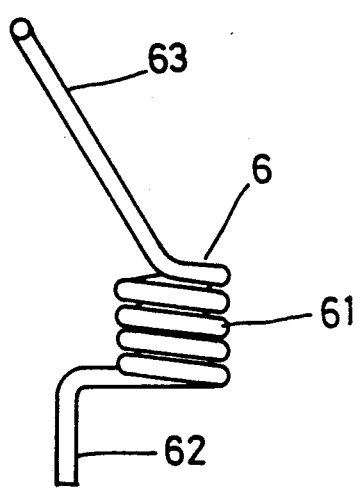
Figure 4:
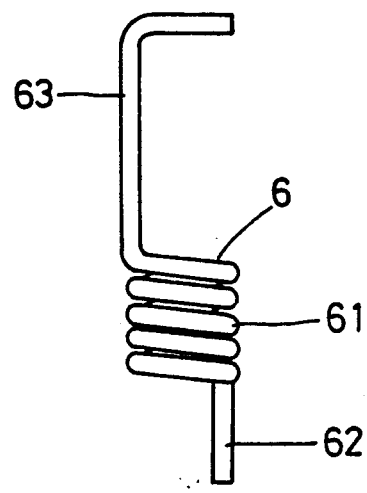
Figure 5:
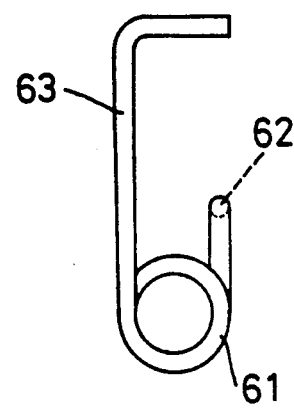

As shown in FIG. 2, this lever spring 6 includes a coil portion 61 and first and second spring legs 62 and 63 extending respectively from opposed ends of the coil portion 61 in substantially parallel with a central axis of the coil portion 61. Further, the lever spring 6 is disposed such that the flextion of its radial center line is confined within a plane normal to an axis of the lever shaft 5, with the spring legs 62 and 63 being engaged with the support wall 33 of the bracket 3 and a top inner face of the brake lever 4, respectively.

More particularly, one terminal end of the coil portion 61 extends outwardly in the tangential direction and this terminal extention is bent at the right angel at its intermediate portion to form the bracket-engaging first spring leg 62 which is parallel with the central axis of the coil portion 61. Similarly, the other terminal end of the coil portion 61 extends along the central axis via a bending part thereof bent toward the central axis. Thus arranged terminal end forms the lever-engaging second spring leg 63 which is inclined relative to the central axis of the coil portion 61. A free end of this second spring leg 63 is bent at the right angle relative to the base portion 41 and mounts a roller 7 at its leading end.

Then, as shown in FIGS. 1 and 2, the first spring leg 62 is received into a spring receiver hole 34 defined in a top face of the support wall 33; whereas, the second spring leg 63 is engaged via the roller 7 with the top inner face of the manual control portion 42.

Further, the roller 7 is formed as an approximate drum-shaped construction having an outer peripheral face with a curvature radius smaller than that of the top inner face of the control portion 42. With this arrangement, frictional resistance between the roller 7 and the top inner face can be advantageously reduced.

With the above-described construction in operation, when the brake lever 4 is manually pivoted from its home position to an operative position relative to the bracket 3, the brake control cable S is activated for a braking operation. Conversely, as the brake lever 4 is released, this brake lever 4 automatically returns to the home position by the urging face of the lever spring 6. In the course of the above braking operation using the brake lever 4, the resilient deformation of the lever spring 6 takes place without entailing reduction in the diameter of the spring 6, and the radial center line of the spring flexes with a sufficiently large curvature radis relative to the pivot direction of the brake lever 4. That is, there hardly occurs radial sliding displacement between the adjacent turns of the coil portion 61 to produce unpleasant creaking noise in the course of the braking operation. Moreover, through appropriate adjustment of the winding pitch and/or of deformation amount of the entire coil portion 61, even the compressive contact between the turns can be avoided. Also, since outer peripheral faces of the turns of the coil portion 61 do not contact the end face of the support shaft 33 of the bracket 3, no creaking noise occurs from this portion either.

Some alternate embodiments will be specifically described next.

I. The lever-engaging second spring leg 63 can dispense with the roller 7 and can be fixedly attached to the inner face of the manual control portion 42 dispense with the roller 7, instead. Also, as the converse arrangement of the foregoing embodiment, it is conceivable to fix the second spring leg 63 to the brake lever 4 while placing the first spring leg 62 into sliding contact with a part of the bracket 3.

II. The bracket-engaging spring leg 62 of the lever spring 6 can be formed along the central axis of the coil portion 61 instead of extending through the tangential extention. Similarly, the lever-engaging spring leg 63 can be formed parallel with the central axis of the coil portion 61 without being inclined relative to the axis.

III. As long as the lever spring 6 can provide its urging force through the flexion of the radial center line of its coil portion 61, the normal alignment between this flextion of the radial center line of the coil portion and the plane defined by the axis of the lever shaft 5 is not absolutely necessary.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A brake control apparatus for a bicycle, comprising:
   a bracket;
   a brake lever pivoted to the bracket via a lever shaft; and
   a lever spring for urging the brake lever to its home position relative to the bracket;
   wherein said lever spring includes a pair of spring legs respectively coupled with said bracket and said brake lever and a coil portion disposed between said spring legs, at least one of said pair of spring legs being movable with respect to one of said bracket and said brake lever, said coil portion being arranged such that return movement of said brake lever to its home position relative to said bracket is realized by flexion of a radial center line of said coil portion of the lever spring.

2. A brake control apparatus for a bicycle as defined in claim 1, wherein the other of said spring legs is fitted into the other of said bracket and said brake control lever.

3. A brake control apparatus for a bicycle as defined in claim 2, wherein one of said spring legs is movably coupled with said brake control lever while the other of said spring legs is fitted into a spring receiver hole defined in said bracket.

4. A brake control apparatus as defined in claim 3, wherein said lever spring is disposed such that said flexion of the radial center line is confined within a plane normal to an axis of said lever shaft.

5. A brake control apparatus for a bicycle as defined in claim 4, wherein said at least one of said spring legs is movable with respect to one of said bracket and brake lever through a roller.

6. A brake control apparatus for a bicycle as defined in claim 5, wherein said roller is attached to a leading end of said at least one of said pair of spring legs and rolls along a surface of said brake lever.

7. A brake control apparatus for a bicycle as defined in claim 1, wherein said radial center line is fixed when said brake lever is in said home position.

* * * * *